(12) United States Patent
Jang et al.

(10) Patent No.: US 9,366,907 B2
(45) Date of Patent: Jun. 14, 2016

(54) COMPOSITION FOR PHOTO-ALIGNMENT LAYER AND PHOTO-ALIGNMENT LAYER

(71) Applicant: LG CHEM, LTD., Seoul (KR)

(72) Inventors: Hyeong Bin Jang, Daejeon (KR); Sung-Ho Chun, Daejeon (KR); Dong Woo Yoo, Daejeon (KR); Seung Yeon Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/426,950

(22) PCT Filed: Sep. 10, 2013

(86) PCT No.: PCT/KR2013/008177
§ 371 (c)(1),
(2) Date: Mar. 9, 2015

(87) PCT Pub. No.: WO2014/038922
PCT Pub. Date: Mar. 13, 2014

(65) Prior Publication Data
US 2015/0241737 A1    Aug. 27, 2015

(30) Foreign Application Priority Data

Sep. 10, 2012 (KR) .................. 10-2012-0100031
Sep. 10, 2013 (KR) .................. 10-2013-0108197

(51) Int. Cl.
| C08F 2/46 | (2006.01) |
| C08F 2/50 | (2006.01) |
| C08G 61/04 | (2006.01) |
| G02F 1/1337 | (2006.01) |
| C09D 179/08 | (2006.01) |
| C08G 73/10 | (2006.01) |
| C08L 45/00 | (2006.01) |
| C09K 19/56 | (2006.01) |

(52) U.S. Cl.
CPC .......... *G02F 1/133711* (2013.01); *C08G 73/10* (2013.01); *C08L 45/00* (2013.01); *C09D 179/08* (2013.01); *C09K 19/56* (2013.01); *G02F 1/1337* (2013.01); *G02F 1/133788* (2013.01)

(58) Field of Classification Search
CPC ................... G02F 1/133711; G02F 1/133788
USPC ............ 522/39, 33, 6, 71, 189, 184, 1; 520/1
See application file for complete search history.

(56) References Cited

U.S. PATENT DOCUMENTS

| 5,464,669 A | 11/1995 | Kang et al. |
| 2004/0009310 A1 | 1/2004 | Nakata et al. |
| 2009/0053430 A1 | 2/2009 | Matsumori et al. |
| 2010/0141862 A1 | 6/2010 | Jo et al. |
| 2012/0010381 A1* | 1/2012 | Choi .................. C07C 69/753 526/244 |
| 2012/0076954 A1 | 3/2012 | Yoo et al. |

FOREIGN PATENT DOCUMENTS

| CN | 101373296 A | 2/2009 |
| CN | 101614912 A | 12/2009 |
| CN | 102417454 A | 4/2012 |
| CN | 102654648 A | 9/2012 |
| EP | 1229066 A1 | 8/2002 |
| JP | 11181127 A | 7/1999 |
| JP | 2009-064000 | * 3/2009 |
| JP | 2009064000 A | 3/2009 |
| JP | 2009-258650 A | 11/2009 |
| JP | 2010-018807 A | 1/2010 |
| JP | 2011076009 A | 4/2011 |
| KR | 1019980057674 A | 9/1998 |
| KR | 1020020068195 A | 8/2002 |
| KR | 10-0663661 B1 | 12/2006 |
| KR | 100671753 B1 | 1/2007 |
| KR | 1020070078799 A | 8/2007 |
| KR | 100789247 B1 | 12/2007 |
| KR | 100882586 B1 | 2/2009 |
| KR | 1020090079842 A | 7/2009 |
| KR | 1020100029144 A | 3/2010 |
| KR | 100982394 B1 | 9/2010 |
| KR | 101002763 B1 | 12/2010 |
| TW | 200930760 A | 7/2009 |
| TW | 201139561 A | 11/2011 |
| TW | 201226445 A | 7/2012 |
| TW | 201235713 A | 9/2012 |

OTHER PUBLICATIONS

Kondo et al, JP 2009-064000 Machine Translation, Mar. 26, 2009.*
Dyaduysha, Andrey et al., Peculiarity of an Oblique Liquid Crystal Alignment Induced by a Photosensitive Orientant, Jpn. J. Appl. Phys. Aug. 1, 1995, pp. L1000-L 1002, vol. 34, Part 2, No. 8A.
Schadt, Martin et al., Surface-Induced Parallel Alignment of Liquid Crystals by Linearly Polymerized Photopolymers, Jpn. J. Appl. Phys. Jul. 1992, pp. 2155-2164, vol. 31, Par 1. No. 7.

* cited by examiner

*Primary Examiner* — Ling Choi
*Assistant Examiner* — Jessica E Whiteley
(74) *Attorney, Agent, or Firm* — Dentons US LLP

(57) ABSTRACT

This invention relates to a composition for a photo-alignment layer which can exhibit superior thermal stability, alignability, and alignment rate, and can also suppress generation of an afterimage and further improve a voltage holding ratio when applied to a liquid crystal cell, and to a photo-alignment layer and a liquid crystal alignment layer using the same. The composition for a photo-alignment layer includes a cyclic olefin-based photo-alignment polymer and a polyamic acid ester-based photo-alignment additive.

18 Claims, 4 Drawing Sheets

COMPOSITION FOR PHOTO-ALIGNMENT LAYER AND PHOTO-ALIGNMENT LAYER

This application is a National Stage Application of International Application No. PCT/KR2013/008177, filed Sep. 10, 2013, and claims the benefit of Korean Patent Application No. 10-2012-0100031 filed on Sep. 10, 2012, and Korean Patent Application No. 10-2013-0108197 filed on Sep. 10, 2013, all of which are hereby incorporated by reference in their entirety for all purposes as if fully set forth herein.

FIELD OF THE INVENTION

The present invention relates to a composition for a photo-alignment layer and a photo-alignment layer. More particularly, the present invention relates to a composition for a photo-alignment layer, which may exhibit superior thermal stability, alignability and alignment rate, and also may suppress generation of an afterimage and may further improve a voltage holding ratio when applied to a liquid crystal cell, and to a photo-alignment layer, a liquid crystal alignment layer and a liquid crystal cell, using the same.

BACKGROUND OF THE INVENTION

With the recent trend of increasing the size of liquid crystal displays, their applications are expanding from personal devices such as mobile phones or laptop computers to home appliances such as wall-mountable TVs. Thus, liquid crystal displays are required to have high definition, high quality, and wide viewing angles. In particular, because thin film transistor-liquid crystal displays (TFT-LCDs) driven by TFTs allow respective pixels to independently operate, the response rate of liquid crystals becomes very high, making it possible to achieve high-definition video images. Accordingly, TFT-LCDs have a variety of applications.

In order for liquid crystals of TFT-LCDs to function as an optical switch, liquid crystals have to be initially aligned in a predetermined direction on a TFT layer located at the innermost position of a display cell. To this end, a liquid crystal alignment layer is utilized. Particularly, photo-alignment methods for orienting a liquid crystal alignment layer by light such as UV are being broadly reviewed these days.

Typically for such photo-alignment, a photo-alignment layer containing a photo-alignment polymer having a photoreactive group is formed under a liquid crystal layer, and then irradiated with linearly polarized UV light so that a photoreaction takes place. As a result, photo-alignment in which the backbone of the photo-alignment polymer is arranged in a predetermined direction occurs, and the alignment layer thus optically aligned has an influence on aligning liquid crystals contained in the liquid crystal layer located thereon.

A typical example of the photo-alignment polymer includes a cyclic olefin-based photo-alignment polymer which is disclosed in Korean Patent No. 0789247, 0671753, or 0982394 by the present inventors. The cyclic olefin-based photo-alignment polymer may exhibit excellent photoreactivity, photo-alignability, and alignment rate as well as superior thermal stability by the cyclic olefin-based backbone structure thereof, and thereby is preferably able to serve as a photo-alignment polymer.

However, the case where the cyclic olefin-based photo-alignment polymer and a photo-alignment layer including the same are applied to a liquid crystal cell to achieve liquid crystal alignment is problematic because an afterimage may be generated or a voltage holding ratio may decrease due to non-hardening of the photoreactive group or the backbone of the photo-alignment polymer which has not yet undergone photoreaction and photo-alignment.

DETAILED DESCRIPTION OF THE INVENTION

Technical Objectives

Accordingly, the present invention provides a composition for a photo-alignment layer, which may exhibit superior thermal stability, alignability, and alignment rate, and may also suppress generation of an afterimage and may further improve a voltage holding ratio when applied to a liquid crystal cell, and a photo-alignment layer formed therefrom.

In addition, the present invention provides a liquid crystal alignment layer including the photo-alignment layer, and a liquid crystal cell.

Technical Solutions

The present invention provides a composition for a photo-alignment layer including a cyclic olefin-based photo-alignment polymer and a polyamic acid ester-based photo-alignment additive.

The present invention also provides a photo-alignment layer including the composition for a photo-alignment layer as above and a cured product thereof.

Further, the present invention provides a liquid crystal alignment layer including the photo-alignment layer with a liquid crystal layer formed on the photo-alignment layer, and a liquid crystal cell.

Hereinafter, a description will be given of a composition for a photo-alignment layer, a photo-alignment layer formed therefrom, a liquid crystal alignment layer, and a liquid crystal cell according to embodiments of the present invention.

Unless otherwise explained, some terms used herein may be defined as follows.

The term "photo-alignability" or "photoreactivity" of any material, polymer, or functional group means that when linearly polarized light, for example linearly polarized UV light, is applied, the corresponding material, polymer, or functional group may be disposed or arranged in a predetermined direction with respect to a polarization direction, and thereby orientation or alignment of a liquid crystal compound may be induced.

The term "cured product" of any composition or "cured" composition means to be inclusive of not only the case where a component having a curable or crosslinkable unsaturated group of the corresponding composition is completely cured, crosslinked, or polymerized, but also the case where such a component is partially cured, crosslinked, or polymerized.

A first embodiment of the present invention provides a composition for a photo-alignment layer, including a cyclic olefin-based photo-alignment polymer and a polyamic acid ester-based photo-alignment additive.

The composition for a photo-alignment layer according to the first embodiment basically includes a cyclic olefin-based photo-alignment polymer, in which, for example, at least one cinnamate-based photoreactive group which will be described later is linked to a cyclic olefin-based backbone. The cyclic olefin-based photo-alignment polymer is disclosed in Korean Patent Nos. 0789247, 0671753, or 0982394 by the present inventors.

The cyclic olefin-based photo-alignment polymer may exhibit a high glass transition temperature and superior thermal stability due to the backbone structure thereof. Moreover, as the cinnamate-based photoreactive group having high photoreactivity is linked to the terminal of the backbone without being restricted to the backbone, excellent photoreactivity, photo-alignability, and alignment rate are known to exhibit. When the composition for a photo-alignment layer according to the first embodiment including such a cyclic olefin-based photo-alignment polymer is applied to a liquid crystal cell so as to achieve liquid crystal alignment, superior thermal stability, alignability, and alignment rate may be obtained.

As such, the cyclic olefin-based photo-alignment polymer is confirmed to, when applied to a liquid crystal cell, generate an afterimage or decrease a voltage holding ratio due to non-hardening of the photoreactive group or the backbone which has not yet undergone photoreaction and photo-alignment.

However, as results of experiments by the present inventors, they have discovered that, in the case where a polyamic acid ester-based photo-alignment additive is used together with the cyclic olefin-based photo-alignment polymer in the photo-alignment layer, problems related to generation of the afterimage or a decrease in the voltage holding ratio may be resolved, while intrinsically superior alignability and alignment rate of the cyclic olefin-based photo-alignment polymer are exhibited thanks to a synergistic action between the photo-alignment polymer and the photo-alignment additive.

This is considered to be because the afterimage caused by a DC voltage may be mitigated due to the synergistic action between the polar polyamic acid ester-based photo-alignment additive and the photo-alignment polymer, based on the following principle in which there fine phase separation occurs between the polyamic acid ester-based photo-alignment additive and the photo-alignment polymer in the course of forming a photo-alignment layer from the composition for a photo-alignment layer. Because of such fine phase separation, the photo-alignment additive is mainly distributed in the lower part of the photo-alignment layer, and simultaneously the photo-alignment polymer may be mainly distributed in the upper part of the photo-alignment layer in contact with a liquid crystal layer. As a result, interactions between the photo-alignment polymer of the photo-alignment layer and the liquid crystal layer may be further enhanced, and charge mobility between the photo-alignment layer and the liquid crystal layer may also become higher. Accordingly, there are more improvements in liquid crystal alignability and voltage holding ratio, and impurities in the form of an electric charge, which may generate an afterimage, may be more quickly removed from the liquid crystal layer, considerably reducing the afterimage.

Hence, the photo-alignment layer is very preferably employed for liquid crystal alignment of a liquid crystal cell.

Below is a detailed description of individual components of a photo-alignment composition according to the first embodiment.

This composition includes a cyclic olefin-based photo-alignment polymer. Such a cyclic olefin-based photo-alignment polymer may contain a cinnamate-based photoreactive group represented by Chemical Formula 1a below in terms of superior photoreactivity, photo-alignability, or alignment rate.

[Chemical Formula 1a]

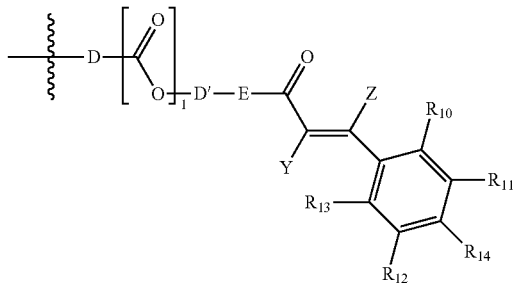

In Chemical Formula 1a, 1 is 0 or 1; D and D' are each independently selected from the group consisting of a chemical bond, oxygen, a substituted or unsubstituted C1~C20 alkylene, a substituted or unsubstituted C3~C12 cycloalkylene, and a substituted or unsubstituted C1~C20 alkylene oxide; E is a chemical bond, a substituted or unsubstituted C1~C20 alkylene, or a substituted or unsubstituted C6~C40 arylene oxide; Y and Z are each independently hydrogen or a substituted or unsubstituted C1~C20 alkyl; and $R_{10}$, $R_{11}$, $R_{12}$, $R_{13}$, and $R_{14}$ are identical to or different from each other and are each independently selected from the group consisting of hydrogen, a halogen, a substituted or unsubstituted C1~C20 alkyl, a substituted or unsubstituted C2~C20 alkenyl, a substituted or unsubstituted C2~C20 alkynyl, a substituted or unsubstituted C3~C12 cycloalkyl, a substituted or unsubstituted C1~C20 alkoxy, a substituted or unsubstituted C6~C30 aryloxy, a substituted or unsubstituted C6~C40 aryl, a C6~C40 heteroaryl containing a heteroelement of Group 14, 15, or 16, a substituted or unsubstituted C6~C40 alkoxyaryl, a cyano, a nitrile, a nitro, and a hydroxy.

Further, the cyclic olefin-based photo-alignment polymer may include a repeating unit of Chemical Formula 3 or 4 below in terms of superior thermal stability or photo-alignability.

[Chemical Formula 3]

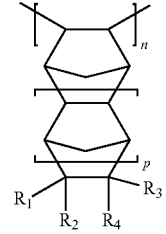

[Chemical Formula 4]

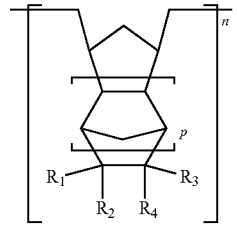

In Chemical Formulas 3 and 4, n is 50~5000; p is an integer of 0~4; and at least one of $R_1$, $R_2$, $R_3$, and $R_4$ is the cinnamate-based photoreactive group of Chemical Formula 1a and the others thereof are identical to or different from each other and are each independently hydrogen, a halogen, a substituted or unsubstituted C1~C20 alkyl, a substituted or unsubstituted C2~C20 alkenyl, a substituted or unsubstituted C2~C20 alkynyl, a substituted or unsubstituted C5~C12 cycloalkyl, a substituted or unsubstituted C6~C40 aryl, a substituted or unsubstituted C7~C15 aralkyl, a substituted or unsubstituted C2~C20 alkynyl, or a polar functional group including a non-hydrocarbonaceous polar group containing at least one element selected from the group consisting of oxygen, nitrogen, phosphorus, sulfur, silicon, and boron.

As represented by Chemical Formula 3 or 4, as the cyclic olefin-based photo-alignment polymer in which at least one cinnamate-based photoreactive group is linked to the terminal of the norbornene-based backbone is included, a photo-alignment layer formed from the composition according to the first embodiment may exhibit higher thermal stability. Also, in the configuration as represented by Chemical Formula 3 or 4, because the photoreactive group may more freely migrate without being affected by other substituents to thus cause a photoreaction, higher photo-alignability or photoreactivity of the photo-alignment layer may be ensured by the cyclic olefin-based photo-alignment polymer.

The cyclic olefin-based photo-alignment polymer may include those disclosed in Korean Patent Nos. 0789247, 0671753, and 0982394, or a variety of photo-alignment polymers having any other photoreactive group may be used.

Meanwhile, in the repeating units of Chemical Formulas 3 and 4, the non-hydrocarbonaceous polar group may be selected from the following functional groups, and may represent various polar functional groups, in addition thereto.

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_k$—$OR_6$, —$(OR5)k$-$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

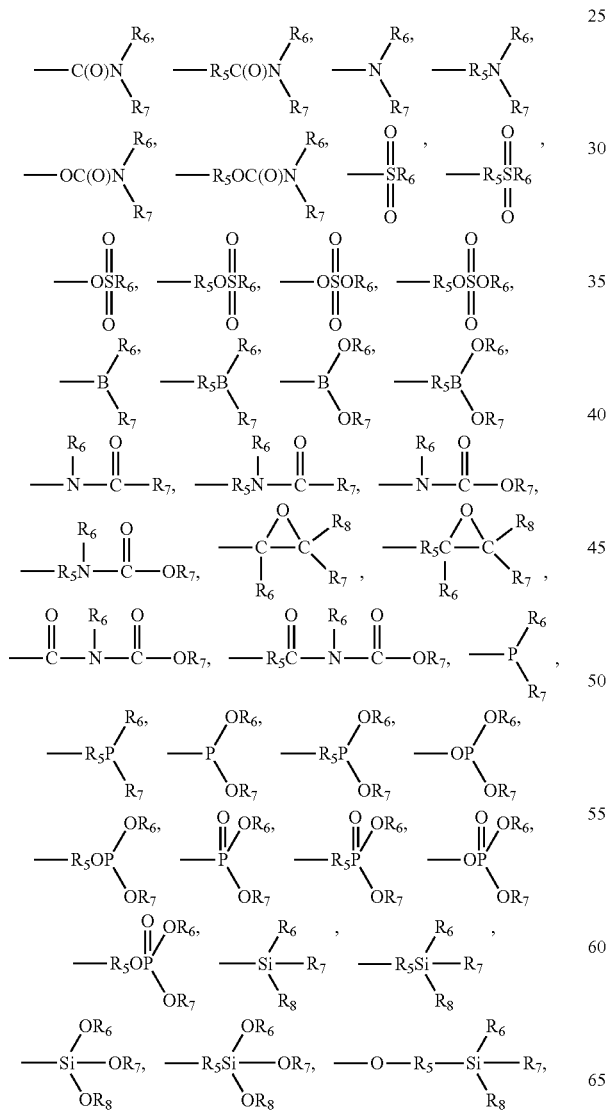

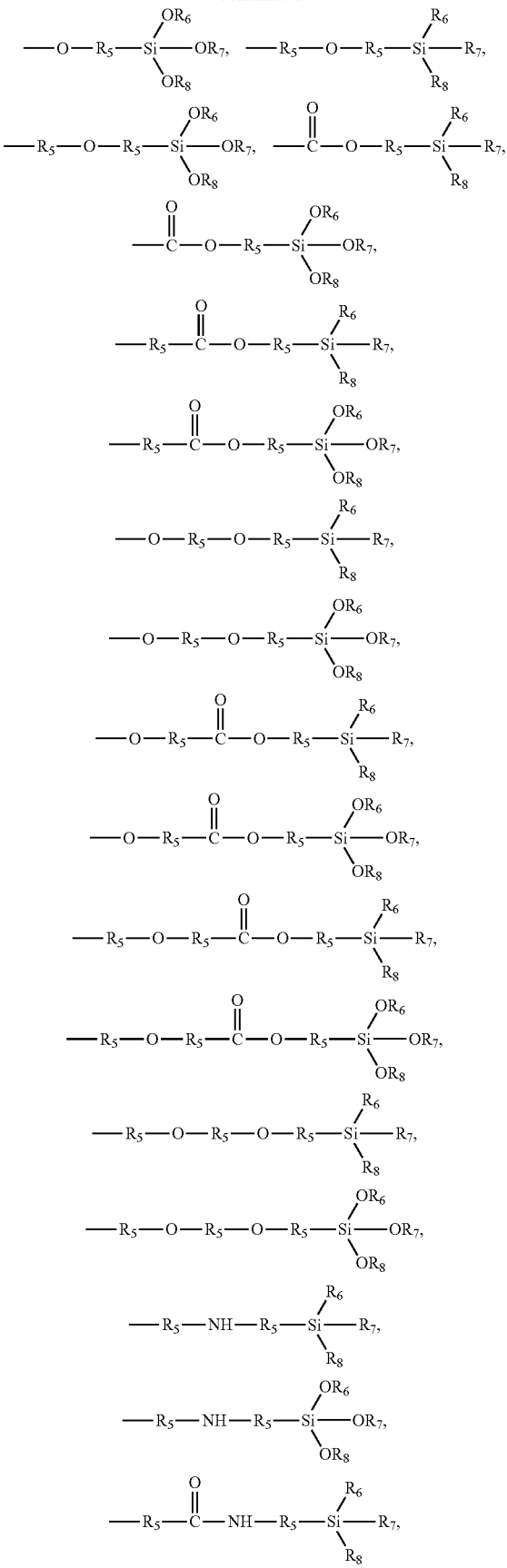

-continued

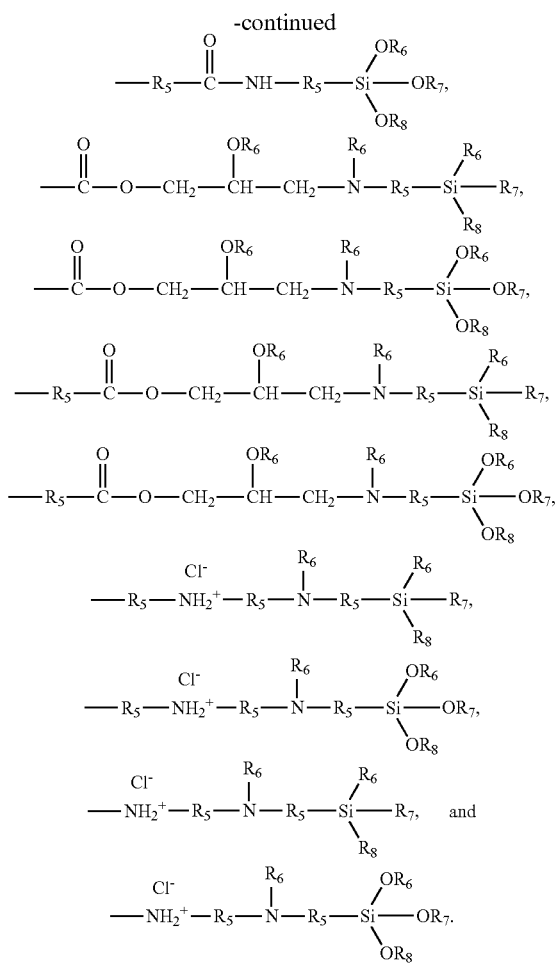

In the above polar functional groups, $R_5$ radicals are identical to or different from each other and are each independently hydrogen; a C1~C20 linear or branched alkylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C2~C20 linear or branched alkenylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C3~C20 linear or branched alkynylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C3~C12 cycloalkylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C6~C40 arylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C1~C20 alkoxylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a C1~C20 carbonyloxylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and $R_6$, $R_7$, and $R_8$ are identical to or different from each other and are each independently hydrogen; halogen; a C1~C20 linear or branched alkyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C2~C20 linear or branched alkenyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C3~C20 linear or branched alkynyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C3~C12 cycloalkyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C6~C40 aryl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; a C1~C20 alkoxy unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a C1~C20 carbonyloxy unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and each k is independently an integer of 1~10.

In addition, in the repeating units of Chemical Formulas 3 and 4, a C6~C40 heteroaryl group containing a hetero element of Group 14, 15, or 16, or a C6~C40 aryl group may include, but is not limited to, at least one selected from the following functional groups.

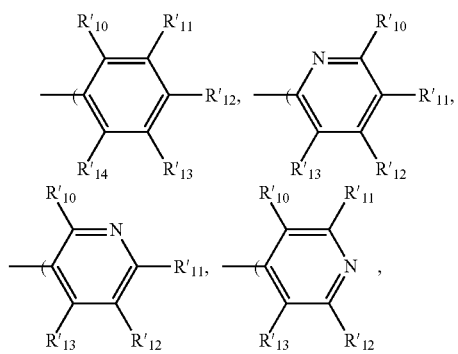

-continued

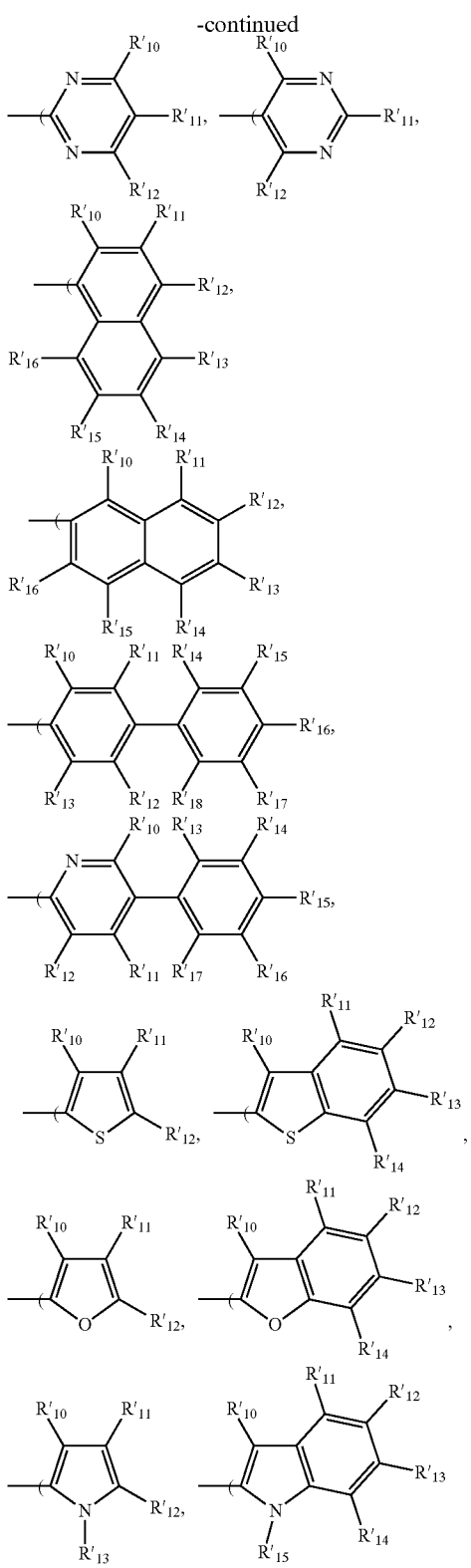

In the above chemical formulas, at least one of $R'_{10}$, $R'_{11}$, $R'_{12}$, $R'_{13}$, $R'_{14}$, $R'_{15}$, $R'_{16}$, $R'_{17}$, and $R'_{18}$ is a substituted or unsubstituted C1~C20 alkoxy or a substituted or unsubstituted C6~C30 aryloxy, and the others thereof are identical to or different from each other and are each independently hydrogen, a substituted or unsubstituted C1~C20 alkyl, a substituted or unsubstituted C1~C20 alkoxy, a substituted or unsubstituted C6~C30 aryloxy, or a substituted or unsubstituted C6~C40 aryl.

The cyclic olefin-based photo-alignment polymer may be either a homopolymer composed of a single repeating unit of Chemical Formula 3 or 4, or a copolymer having two or more repeating units.

In the configuration of the cyclic olefin-based photo-alignment polymer as above, individual substituents may be defined as follows.

The term "alkyl" refers to a linear or branched saturated monovalent hydrocarbon moiety of 1~20, preferably 1~10, and more preferably 1~6 carbon atoms. The alkyl group may be inclusive of not only those unsubstituted but also those further substituted with a predetermined substituent as will be described later. Examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" refers to a linear or branched monovalent hydrocarbon moiety of 2~20, preferably 2~10, and more preferably 2~6 carbon atoms, with at least one carbon-carbon double bond. The alkenyl group may be linked via carbon atoms including a carbon-carbon double bond or via saturated carbon atoms. The alkenyl group may be inclusive of not only those unsubstituted but also those further substituted with a predetermined substituent as will be described later. Examples of the alkenyl group may include ethenyl, 1-propenyl, 2-propenyl, 2-butenyl, 3-butenyl, pentenyl, 5-hexenyl, dodecenyl, etc.

The term "alkynyl" refers to a linear or branched monovalent hydrocarbon moiety of 2~20, preferably 2~10, and more preferably 2~6 carbon atoms, with at least one carbon-carbon triple bond. The alkynyl group may be linked via carbon atoms including a carbon-carbon triple bond or via saturated carbon atoms. The alkynyl group may be inclusive of those further substituted with a predetermined substituent as will be described later. Examples thereof may include ethynyl, propynyl, etc.

The term "cycloalkyl" refers to a saturated or unsaturated non-aromatic monovalent monocyclic, bicyclic, or tricyclic hydrocarbon moiety of 3~12 ring carbons, and may be inclusive of those further substituted with a predetermined substituent as will be described later. Examples thereof may include cyclopropyl, cyclobutyl, cyclopentyl, cyclopentenyl, cyclohexyl, cyclohexenyl, cycloheptyl, cyclooctyl, decahydronaphthalenyl, adamantly, norbornyl (i.e. bicyclo[2,2,1]hept-5-enyl), etc.

The term "aryl" refers to a monovalent monocyclic, bicyclic, or tricyclic aromatic hydrocarbon moiety having 6~40 and preferably 6~12 ring atoms, and may be inclusive of those further substituted with a predetermined substituent as will be described later. Examples of the aryl group may include phenyl, naphthalenyl, fluorenyl, etc.

The term "alkoxyaryl" refers to an aryl radical in which at least one hydrogen atom of the aryl group defined above is substituted with an alkoxy group. Examples of the alkoxyaryl group may include methoxyphenyl, ethoxyphenyl, propoxyphenyl, butoxyphenyl, pentoxyphenyl, hexoxyphenyl, heptoxy, octoxy, nanoxy, methoxybiphenyl, methoxynaphthalenyl, methoxyfluorenyl, methoxyanthracenyl, etc.

The term "aralkyl" refers to an alkyl radical in which at least one hydrogen atom of the alkyl group defined above is substituted with an aryl group, and may be inclusive of those further substituted with a predetermined substituent as will be described later. Examples thereof may include benzyl, benzhydryl, trityl, etc.

The term "alkylene" refers to a linear or branched saturated bivalent hydrocarbon moiety of 1~20, preferably 1~10, and more preferably 1~6 carbon atoms. The alkylene group may be inclusive of those further substituted with a predetermined substituent as will be described later. Examples of the alkylene group may include methylene, ethylene, propylene, butylene, hexylene, etc.

The term "alkenylene" refers to a linear or branched bivalent hydrocarbon moiety of 2~20, preferably 2~10, and more preferably 2~6 carbon atoms, with at least one carbon-carbon double bond. The alkenylene group may be linked via carbon atoms including a carbon-carbon double bond and/or via saturated carbon atoms, and may be inclusive of those further substituted with a predetermined substituent as will be described later.

The term "cycloalkylene" refers to a saturated or unsaturated non-aromatic bivalent monocyclic, bicyclic, or tricyclic hydrocarbon moiety of 3~12 ring carbons, and may be inclusive of those further substituted with a predetermined substituent as will be described later. Examples thereof may include cyclopropylene, cyclobutylene, etc.

The term "arylene" refers to a bivalent monocyclic, bicyclic, or tricyclic aromatic hydrocarbon moiety having 6~20 and preferably 6~12 ring atoms, and may be inclusive of those further substituted with a predetermined substituent as will be described later. The aromatic moiety contains only carbon atoms. Examples of the arylene group may include phenylene, etc.

The term "aralkylene" refers to a bivalent moiety in which at least one hydrogen atom of the alkyl group defined above is substituted with an aryl group, and may be inclusive of those further substituted with a predetermined substituent as will be described later. Examples thereof may include benzylene, etc.

The term "alkynylene" refers to a linear or branched bivalent hydrocarbon moiety of 2~20, preferably 2~10, and more preferably 2~6 carbon atoms, with at least one carbon-carbon triple bond. The alkynylene group may be linked via carbon atoms including a carbon-carbon triple bond or via saturated carbon atoms, and may be inclusive of those further substituted with a predetermined substituent as will be described later. Examples thereof may include ethynylene, propynylene, etc.

The aforementioned substituents which are "substituted or unsubstituted" are meant to be inclusive of not only these individual substituents themselves but also those further substituted with a predetermined substituent. Examples of the substituent used to further substitute individual substituents herein may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, etc.

The method of preparing the photo-alignment polymer is well known to those skilled in the art, as disclosed in a variety of documents related with various photo-alignment polymers. Examples of such documents are stated above.

For example, in the case where the photo-alignment polymer includes a repeating unit of Chemical Formula 3, it may be prepared by subjecting a monomer of Chemical Formula 2 below to addition polymerization in the presence of a catalyst composition containing a precatalyst having a transition metal of Group 10 and a cocatalyst, thus forming the repeating unit of Chemical Formula 3.

[Chemical Formula 2]

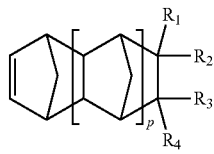

In Chemical Formula 2, p, $R_1$, $R_2$, $R_3$, and $R_4$ are as defined in Chemical Formula 3.

Further, in the case where the photo-alignment polymer includes a repeating unit of Chemical Formula 4, it may be prepared by subjecting a monomer of Chemical Formula 2 to ring-opening polymerization in the presence of a catalyst composition containing a precatalyst having a transition metal of Group 4, 6, or 8 and a cocatalyst, thus forming the repeating unit of Chemical Formula 4. Alternatively, the photo-alignment polymer including the repeating unit of Chemical Formula 4 may be prepared by subjecting norbornene alkylol such as norbornene methanol as a monomer to ring-opening polymerization in the presence of a catalyst composition containing a precatalyst having a transition metal of Group 4, 6, or 8 and a cocatalyst, thus forming a ring-opened polymer having a 5-membered ring, and then introducing a photoreactive group to the ring-opened polymer. As such, introduction of the photoreactive group may be carried out by subjecting the ring-opened polymer to condensation with a carboxylic acid compound or an acyl chloride compound having a photoreactive group corresponding to Chemical Formula 1a.

In the ring-opening polymerization step, when hydrogen is added to the double bond of the norbornene ring contained in the monomer of Chemical Formula 2, a ring-opening reaction may be carried out and polymerization may take place, thereby preparing the repeating unit of Chemical Formula 4 and a photoreactive polymer including the same.

The specific preparation process and reaction conditions for preparing the photo-alignment polymer are widely known to those skilled in the art, and thus a description thereof is omitted.

The composition for a photo-alignment layer according to the first embodiment includes a polyamic acid ester-based photo-alignment additive, in addition to the cyclic olefin-based photo-alignment polymer. As the polyamic acid ester-based photo-alignment additive is also used, the photo-alignment layer formed from the composition according to the first embodiment may be considerably reduced in afterimage and may be further improved in liquid crystal alignability and voltage holding ratio, as mentioned above.

Examples of the polyamic acid ester-based photo-alignment additive may include those including a repeating unit of Chemical Formula 5 or 6 below.

[Chemical Formula 5]

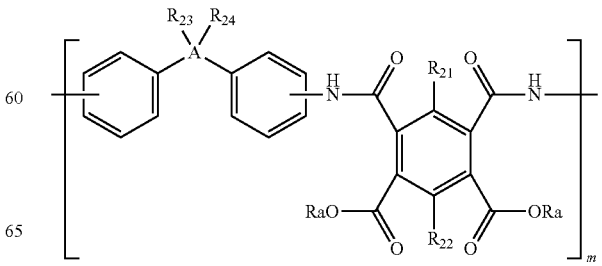

[Chemical Formula 6]

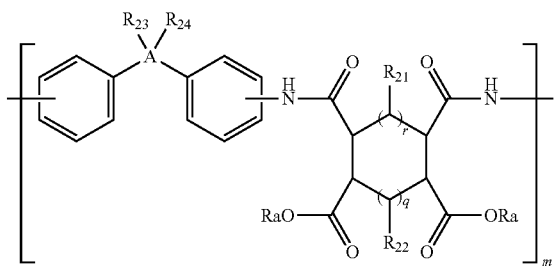

[Chemical Formula 5a]

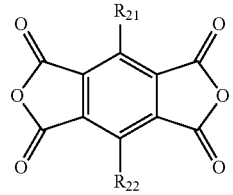

[Chemical Formula 6a]

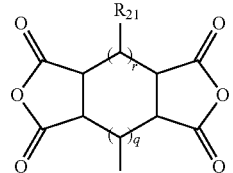

[Chemical Formula 5b]

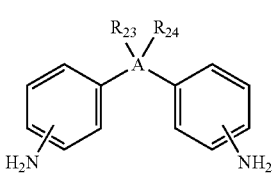

In Chemical Formulas 5 and 6, m is 100~10,000; q and r are each independently an integer of 0~4; $R_{21}$ and $R_{22}$ are each independently hydrogen, a halogen, a substituted or unsubstituted C1~C20 alkyl, a substituted or unsubstituted C2~C20 alkenyl, a substituted or unsubstituted C2~C20 alkynyl, a substituted or unsubstituted C3~C12 cycloalkyl, a substituted or unsubstituted C6~C40 aryl, a substituted or unsubstituted C7~C15 aralkyl, or a polar functional group including a non-hydrocarbonaceous polar group containing at least one element selected from the group consisting of oxygen, nitrogen, phosphorus, sulfur, silicon, and boron, and in Chemical Formula 6, in the case where $R_{21}$ and $R_{22}$ are not hydrogen, a halogen, or a polar functional group, $R_{21}$ radicals may be connected to each other or $R_{22}$ radicals may be connected to each other to form a C4~C12 saturated or unsaturated ring or a C6~C24 aromatic ring, or $R_{21}$ and $R_{22}$ may be connected to each other to form a C1~C10 alkylidene group; A is a chemical bond, oxygen, sulfur, phosphorus, or —NH—; and $R_{23}$ and $R_{24}$ are each independently hydrogen, a halogen, a substituted or unsubstituted C1~C20 alkyl, a substituted or unsubstituted C2~C20 alkenyl, a substituted or unsubstituted C2~C20 alkynyl, a substituted or unsubstituted C3~C12 cycloalkyl, a substituted or unsubstituted C6~C40 aryl, a substituted or unsubstituted C7~C15 aralkyl, or a polar functional group including a non-hydrocarbonaceous polar group containing at least one element selected from the group consisting of oxygen, nitrogen, phosphorus, sulfur, silicon, and boron; and $R_a$ is a substituted or unsubstituted C1~C20 alkyl or a substituted or unsubstituted C6~C40 aryl.

The polyamic acid ester-based photo-alignment additive having the repeating unit structure of Chemical Formula 5 or 6 may more effectively exhibit a synergistic action with the aforementioned photo-alignment polymer, and may thus contribute to suppressing generation of an afterimage and improving alignability and a voltage holding ratio. Furthermore, as such a photo-alignment additive does not have the structure of a polyamic acid-based polymer or a polyimide-based polymer but has the structure of a polyamic acid ester-based polymer introduced with an alkyl group of $R_a$, it is more efficiently soluble in various organic solvents. Accordingly, when the polyamic acid ester-based photo-alignment additive including the repeating unit of Chemical Formula 5 or 6 is contained in the composition according to the first embodiment, it is much easier to apply the composition according to the first embodiment onto a substrate, and a photo-alignment layer formed therefrom may show further improved photo-alignability and alignment rate.

Meanwhile, the polyamic acid ester-based photo-alignment additive may result from condensation polymerization of an ester derivative of a dianhyride compound of Chemical Formula 5a or 6a below, and a diamine compound of Chemical Formula 5b below.

In Chemical Formulas 5a, 5b, and 6a, q, r, $R_{21}$, $R_{22}$, $R_{23}$, and $R_{24}$ are as defined in Chemical Formulas 5 and 6.

More specifically, the polyamic acid ester-based photo-alignment additive including the repeating unit of Chemical Formula 5 or 6 may be prepared by subjecting the dianhydride compound of Chemical Formula 5a or 6a to esterification with an alkyl alcohol or an aryl alcohol to obtain an ester derivative of the dianhydride compound, which is then condensation polymerized with the diamine compound of Chemical Formula 5b. The specific reaction conditions for the above reaction steps are described in examples as will be described later.

In addition, the composition for a photo-alignment layer according to the first embodiment may include the photo-alignment polymer and the photo-alignment additive such that the weight ratio of the cyclic olefin-based photo-alignment polymer to the polyamic acid ester-based photo-alignment additive is in the range of about 2:1~8:1, about 3:1~7:1, or about 4:1~6:1. As the photo-alignment polymer and the photo-alignment additive are contained at such a weight ratio, the composition according to the first embodiment and the photo-alignment layer formed therefrom may be further improved in alignability and alignment rate. When such a photo-alignment layer is applied to a liquid crystal cell, etc., an afterimage may be further reduced and a voltage holding ratio may become higher.

The composition for a photo-alignment layer according to the first embodiment may further include a photocurable binder, in addition to the photo-alignment polymer and the photo-alignment additive as above. This binder may be formed into a binder resin having a reticular crosslinked structure through photocuring, thereby attaining stable alignability.

As the binder, any polymerizable compound, oligomer, or polymer which may be cured via irradiation with light such as UV light may be used without particular limitation. In particular, a (meth)acrylate-based compound, for example, a (meth)acrylate-based compound having a bifunctional or trifunctional or higher acrylate group, for example, a trifunctional to hexafunctional acrylate group, may be used in terms of forming an appropriate polymerized, cured, or crosslinked structure.

Specifically, the binder may be selected from among pentaerythritol triacrylate, tris(2-acryloyloxyethyl)isocyanurate, trimethylolpropane triacrylate, dipentaerythritol hexaacrylate, and mixtures of two or more thereof.

The composition for a photo-alignment layer according to the first embodiment may further include a photoinitiator, in addition to the above components. Such a photoinitiator may be any initiator known to initiate and facilitate photocuring of the binder, and for example, an initiator under the brand name of Irgacure 907 or 819 may be used.

The composition for a photo-alignment layer may further include an organic solvent, in order to dissolve individual components as above. The organic solvent may be selected from among N-methylpyrrolidone (NMP), toluene, xylene, anisole, chlorobenzene, dichloromethane, ethyl acetate, dichloroethane, cyclohexanone, cyclopentanone, propylene glycol methyl ether acetate, and mixtures of two or more thereof. In addition thereto, any solvent may be used so long as individual components are effectively dissolved therein depending on the kind thereof so as to be applied on the substrate.

The composition for a photo-alignment layer may include, based on the total weight of solids thereof, about 35~75 wt % of a polymer including both the cyclic olefin-based photo-alignment polymer and the polyamic acid ester-based photo-alignment additive, about 20~60 wt % of the binder, and about 1~6 wt % of the photoinitiator. As such, the weight of solids may indicate the sum of weights of the components, other than the organic solvent, of the composition for a photo-alignment layer.

The solid content of the composition for a photo-alignment layer may approximate to 1~15 wt %. Thereby, the composition may manifest preferable applicability.

A second embodiment of the present invention provides a photo-alignment layer formed from the composition for a photo-alignment layer as above. This photo-alignment layer may include the composition for a photo-alignment layer or a cured product thereof. For example, the photo-alignment layer may include the cyclic olefin-based photo-alignment polymer in which at least a portion of a photoreactive group is optically aligned and the polyamic acid ester-based photo-alignment additive, and optionally may further include a binder resin having a reticular crosslinked structure by photocuring the above binder, for example, a (meth)acrylate-based crosslinked polymer. Furthermore, a portion of photoinitiator may be left behind in the photo-alignment layer.

As fine phase separation occurs between the polyamic acid ester-based photo-alignment additive and the photo-alignment polymer occurs in the photo-alignment layer, a difference or gradient in distribution between the photo-alignment additive and the photo-alignment polymer may be created. Specifically, because of such a fine phase separation, the photo-alignment additive is mainly distributed in the lower part of the photo-alignment layer, and simultaneously the photo-alignment polymer may be mainly distributed in the upper part of the photo-alignment layer in contact with a liquid crystal layer.

More specifically, the upper surface of the photo-alignment layer in contact with a liquid crystal layer may contain the cyclic olefin-based photo-alignment polymer distributed in a larger amount compared to the lower surface thereof. The upper surface of the photo-alignment layer may contain the polyamic acid ester-based photo-alignment additive distributed in a smaller amount compared to the lower surface thereof. In a more specific embodiment, the photo-alignment polymer may be distributed in an amount of about 70 wt % or more, about 80 wt % or more, or about 90 wt % or more based on the total amount thereof in the range of 50% thickness corresponding to the upper part of the photo-alignment layer, and the photo-alignment polymer may be distributed in the remaining amount in the range of 50% thickness corresponding to the lower part thereof. In contrast, the photo-alignment additive may be distributed in an amount of about 70 wt % or more, about 80 wt % or more, or about 90 wt % or more based on the total amount thereof in the range of 50% thickness corresponding to the lower part of the photo-alignment layer, and the photo-alignment additive may be distributed in the remaining amount in the range of 50% thickness corresponding to the upper part thereof.

The difference or gradient in distribution between the photo-alignment additive and the photo-alignment polymer in the photo-alignment layer may be determined by analyzing or measuring the photo-alignment layer using TOF-SIMS (Time-of-Flight Secondary Ion Mass Spectroscopy) as a kind of surface analysis method. More specifically, such a distribution difference or gradient can be confirmed because the upper surface of the photo-alignment layer in contact with the liquid crystal layer exhibits the higher intensity of peak derived from a substituent linked to the terminal of the photo-alignment polymer, for example, a substituent such as a halogen including fluorine linked to at least one of $R_{10}$ to $R_{14}$ as above, compared to the lower surface thereof, when analyzed or measured by TOF-SIMS.

As mentioned above, the distribution difference or gradient due to a fine phase separation between the photo-alignment polymer and the photo-alignment additive in the photo-alignment layer may result in further enhanced interactions between the photo-alignment polymer of the photo-alignment layer and the liquid crystal layer thereon, and higher charge mobility between the photo-alignment layer and the liquid crystal layer. Accordingly, liquid crystal alignability and voltage holding ratio may be further improved, and impurities in the form of an electric charge, which may generate an afterimage, may be more rapidly removed from the liquid crystal layer, considerably reducing the afterimage.

The photo-alignment layer may be formed by a method including applying polarized UV light, for example linearly polarized UV light, to the composition for a photo-alignment layer formed on a substrate so that at least a portion of the photo-alignment polymer is optically aligned. When this photo-alignment step is performed under irradiation with polarized UV light, at least a portion of the photoreactive group of the photo-alignment polymer may induce a photoreaction such as isomerization or dimerization and may thus be optically aligned. Consequently, the photo-alignment layer according to the second embodiment which includes the optically aligned photo-alignment polymer and the photo-alignment additive may be formed.

In the photo-alignment step, the composition for a photo-alignment layer may be irradiated with polarized UV light in a wavelength range of about 150~450 nm. Depending on the kind of photoreactive group of the photo-alignment polymer, the wavelength range of polarized UV light may be adjusted. Although the intensity of irradiated UV light may vary depending on the structure of the photo-alignment polymer or the photoreactive group linked thereto, energy ranging from about 50 mJ/cm² to 10 J/cm², and preferably from about 500 mJ/cm² to 5 J/cm², may be applied.

The UV light is subjected to polarizing treatment by using a process in which UV light is passed through or reflected from ① a polarizing device using a substrate, in which the surface of a transparent substrate such as quartz glass, soda-lime glass, or soda-lime-free glass is coated with a dielectric anisotropic material, ② a polarizing plate on which an aluminum or metal wire is finely deposited, or ③ a Brewster polarizing device using reflection by quartz glass, and UV light subjected to such polarizing treatment may be applied to the composition. The polarized UV light may be applied in a direction perpendicular to the surface of the substrate, or may be slantingly applied at a specific incident angle.

Also, upon UV irradiation, the temperature of the substrate may approximate to room temperature, but in some cases, UV light may be applied in a state of being heated in a temperature range of about 100° C. or less.

Under irradiation with polarized UV light in the photo-alignment step, photocuring of the binder optically contained in the composition for a photo-alignment layer may be carried out together. In this case, as only the photo-alignment step progresses, the cured photo-alignment layer may result. For more effective photocuring, applying UV light to the composition for a photo-alignment layer to photocure the binder may be further implemented after the photo-alignment step.

After photocuring of the binder, a binder resin having a reticular crosslinked structure may be formed, the crosslinked structure of which may contain the photo-alignment polymer, thus stably maintaining superior alignability.

In the preparation method as above, the composition for a photo-alignment layer is applied onto the substrate, dried, and then optically aligned using polarized UV light. As such, the coating process may be appropriately determined depending on the specific structure of the photo-alignment polymer or the kind of substrate, and may be exemplified by a roll coating process, a spin coating process, a printing process, an inkjet spraying process, or a slit nozzle process.

In the course of a series of application, drying, and photo-alignment of the composition for a photo-alignment layer, fine phase separation between the photo-alignment polymer and the photo-alignment additive may occur, resulting in a difference or gradient in distribution between the photo-alignment polymer and the photo-alignment additive in the final photo-alignment layer.

In the preparation method as above, in order to further enhance adhesion to the substrate, a functional silane-containing compound, a functional fluorine-containing compound, or a functional titanium-containing compound may be applied onto the substrate in advance.

In the drying step to remove the organic solvent, the coating may be heated or vacuum evaporation may be conducted. The drying step may be performed at about 50~250° C. for about 1~20 min.

The photo-alignment layer according to the second embodiment is applied to a liquid crystal cell to achieve liquid crystal alignment while exhibiting superior alignability and alignment rate, thereby reducing an afterimage and further improving a voltage holding ratio.

A third embodiment of the present invention provides a liquid crystal alignment layer including the photo-alignment layer as above and a liquid crystal layer formed on the photo-alignment layer, and a liquid crystal cell including the liquid crystal alignment layer. In such a liquid crystal alignment layer, liquid crystals of the liquid crystal layer may be aligned by the photo-alignment layer in which at least a portion of the photoreactive group is optically aligned. As such, superior liquid crystal alignability and alignment stability may be exhibited and maintained. Furthermore, the liquid crystal cell may manifest a reduced afterimage and a superior voltage holding ratio thanks to the photo-alignment layer as above.

In the liquid crystal alignment layer, a difference or gradient in distribution between the photo-alignment additive and the photo-alignment polymer of the photo-alignment layer may appear as mentioned above. Specifically, the cyclic olefin-based photo-alignment polymer may be distributed in a larger amount at the upper surface of the photo-alignment layer in contact with the liquid crystal layer than at the lower surface thereof, and the polyamic acid ester-based photo-alignment additive may be distributed in a smaller amount at the upper surface of the photo-alignment layer than at the lower surface thereof.

A reduced afterimage and a superior voltage holding ratio of the liquid crystal alignment layer and the liquid crystal cell may result from enhancing the interactions between the photo-alignment polymer and the liquid crystal layer, due to such a distribution gradient or difference.

The liquid crystal alignment layer and the liquid crystal cell may be manufactured using typical methods, with the exception that the photo-alignment layer according to the second embodiment of the present invention is contained. For example, a photoreactive adhesive containing a ball spacer is applied on ends of any one of two glass substrates having the photo-alignment layer, the other glass substrate is attached thereto, and UV light is applied only to the portions on which the adhesive is applied, thus completing a cell. Then, liquid crystals (liquid crystal molecules) are injected into the completed cell and thermally treated, thereby manufacturing the liquid crystal alignment layer and the liquid crystal cell.

Advantageous Effect of the Invention

According to the present invention, a composition for a photo-alignment layer, which can exhibit superior thermal stability, alignability and alignment rate and can also reduce an afterimage and further improve a voltage holding ratio when applied to a liquid crystal cell, and a photo-alignment layer and a liquid crystal alignment layer using the same, can be provided. In addition, because the composition for a photo-alignment layer can be very efficiently applied, it can be more effectively utilized for liquid crystal alignment, etc. of the liquid crystal cell.

DETAILED DESCRIPTION OF THE EMBODIMENTS

A better understanding of the present invention may be obtained via the following examples which are set forth to illustrate, but are not to be construed as limiting, the present invention.

PREPARATION EXAMPLE 1

Synthesis of Polyamic Acid Ester-based Photo-alignment Additive 8.02 g (40.9 mmol) of cyclobutane-1,2,3,4-tetracarboxylic dianhydride (CBDA) was reacted under reflux for 8 h in 100 ml of methanol. Termination of the reaction was confirmed by gas chromatography, after which the solvent was removed in a vacuum, followed by recrystallization in a solvent mixture of ethylacetate (EA) and cyclohexane at 3:1 (a volume ratio), thus obtaining 3.30 g (12.7 mmol) of centrosymmetrical dimethyl ester at a yield of 31%.

2.50 g (9.61 mmol) of the dimethyl ester was refluxed for 5 h in a thionyl chloride solvent, and an excess of remaining thionyl chloride was distilled off under reduced pressure, followed by recrystallization in n-hexane, thus obtaining a dichloride-type compound at a yield of 82%.

Figure 1:
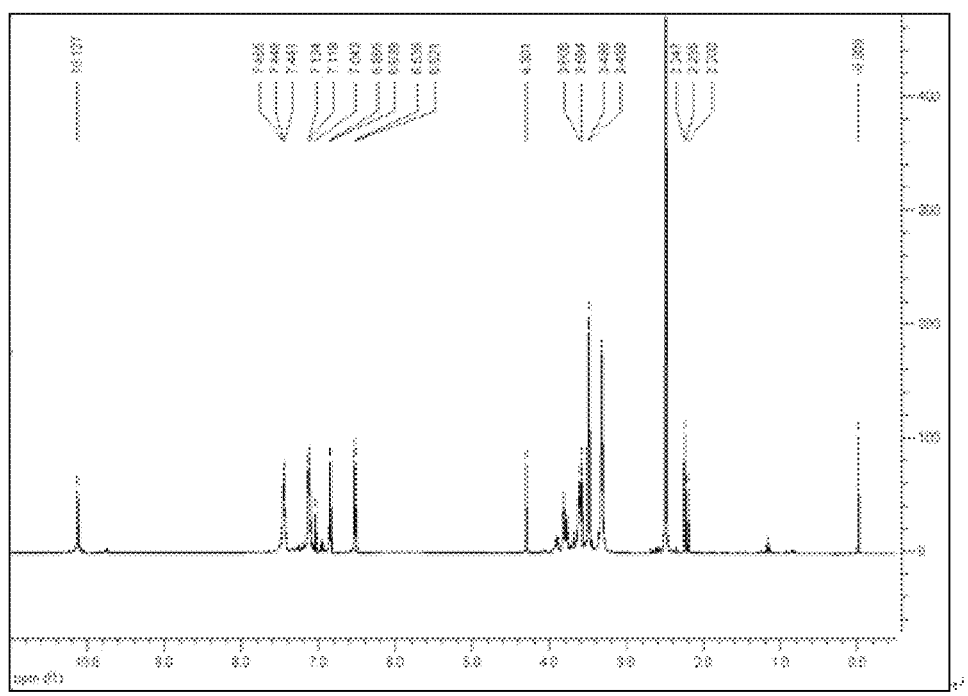
FIGS. 1 to 3 are NMR spectra of polyamic acid ester-based photo-alignment additives obtained in Preparation Examples 1 to 3.

An aqueous solution of 0.97 g (5.04 mmol) of 4,4'-diaminodiphenylmethane (MDA) and 0.65 g of KOH dissolved in 200 ml of water was mixed with a solution of 1.5 g (5.04 mmol) of the dichloride-type compound dissolved in xylene, and the resulting mixture was vigorously stirred at 10~20° C. for 2 h. The resulting product was filtered to afford a precipitate which was then vacuum-dried for 24 h (yield: 66%). The production of the polyamic acid ester-based photo-alignment additive thus obtained was confirmed by NMR and GPC, with a weight average molecular weight of 54,000 and PDI of 1.46. NMR spectrum of the polyamic acid ester-based photo-alignment additive is illustrated in FIG. 1.

PREPARATION EXAMPLE 2

Synthesis of Polyamic Acid Ester-based Photo-alignment Additive 8.92 g (40.9 mmol) of pyromellitic dianhydride (PMDA) was reacted under reflux for 8 h in 100 ml of methanol. Termination of the reaction was confirmed by gas chromatography, after which the solvent was removed in a vacuum, followed by recrystallization in a solvent mixture of EA and cyclohexane at 3:1 (a volume ratio), thus obtaining 3.30 g (11.4 mmol) of centrosymmetrical dimethyl ester at a yield of 31%.

2.50 g (9.61 mmol) of the dimethyl ester was refluxed for 5 h in a thionyl chloride solvent, and an excess of the remaining thionyl chloride was distilled off under reduced pressure, followed by recrystallization in n-hexane, thus obtaining a dichloride-type compound at a yield of 82%.

Figure 2:
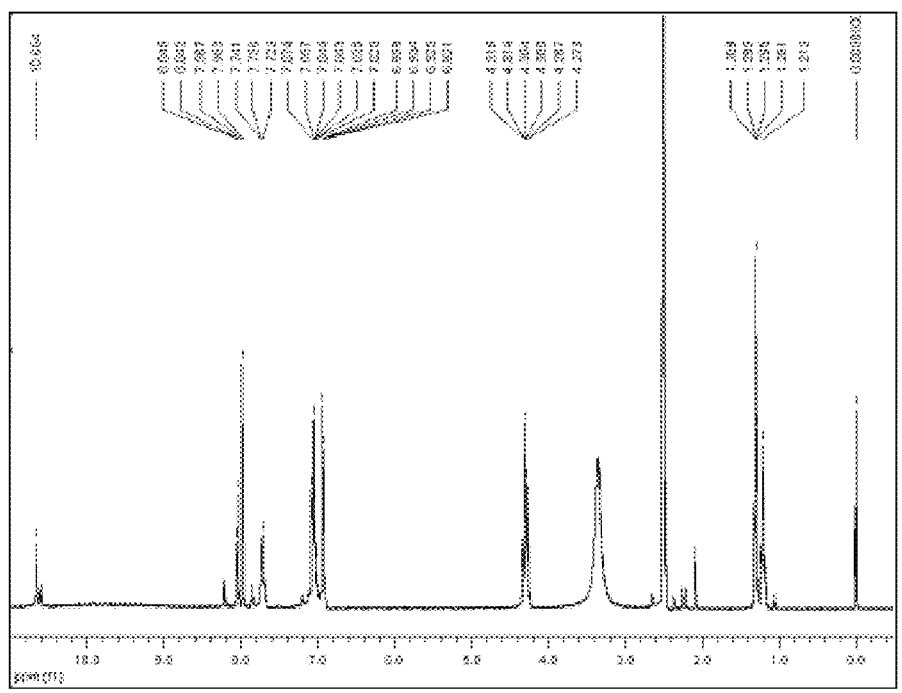

An aqueous solution of 0.99 g (5.04 mmol) of 4,4'-oxydianiline (ODA) and 0.65 g of KOH dissolved in 200 ml of water was mixed with a solution of 1.5 g (5.04 mmol) of the dichloride-type compound dissolved in xylene, and the resulting mixture was vigorously stirred at 10~20° C. for 2 h. The resulting product was filtered to afford a precipitate which was then vacuum-dried for 24 h (yield: 66%). The production of the polyamic acid ester-based photo-alignment additive thus obtained was confirmed by NMR and GPC, with a weight average molecular weight of 38,000 and PDI of 1.75. An NMR spectrum of the polyamic acid ester-based photo-alignment additive is illustrated in FIG. 2.

PREPARATION EXAMPLE 3

Synthesis of Polyamic Acid Ester-based Photo-alignment Additive 8.92 g (40.9 mmol) of pyromellitic dianhydride (PMDA) was reacted under reflux for 8 h in 100 ml of methanol. Termination of the reaction was confirmed by gas chromatography, after which the solvent was removed in a vacuum, followed by recrystallization in a solvent mixture of EA and cyclohexane at 3:1 (a volume ratio), thus obtaining 3.30 g (11.4 mmol) of centrosymmetrical dimethyl ester at a yield of 31%.

2.50 g (9.61 mmol) of the dimethyl ester was refluxed for 5 h in a thionyl chloride solvent, and an excess of remaining thionyl chloride was distilled off under reduced pressure, followed by recrystallization in n-hexane, thus obtaining a dichloride-type compound at a yield of 82%.

Figure 3:
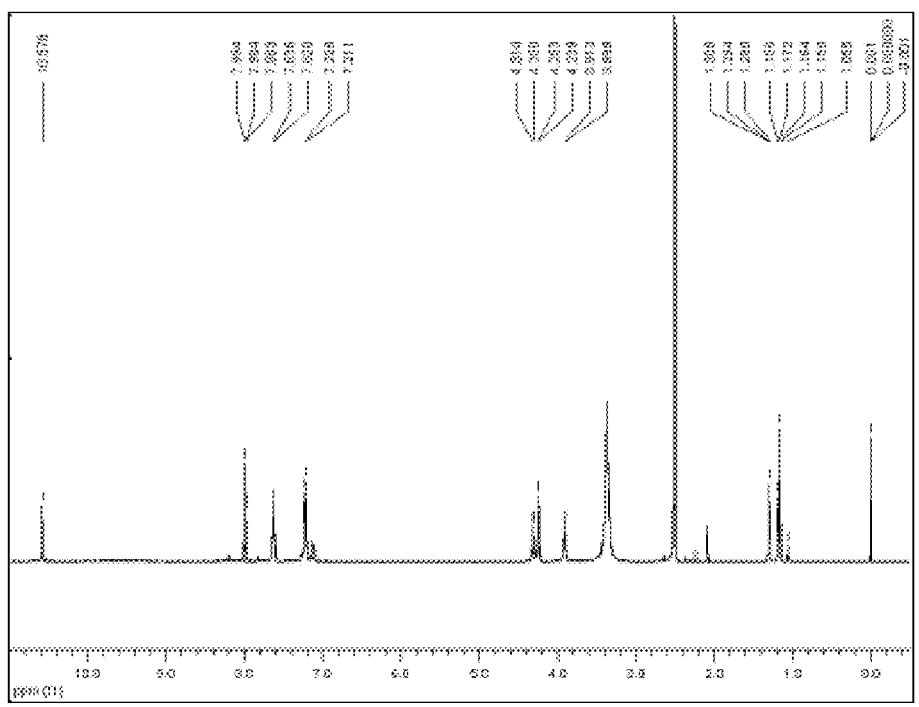

An aqueous solution of 0.97 g (5.04 mmol) of 4,4'-diaminodiphenylmethane (MDA) and 0.65 g of KOH dissolved in 200 ml of water was mixed with a solution of 1.5 g (5.04 mmol) of the dichloride-type compound dissolved in xylene, and the resulting mixture was vigorously stirred at 10~20° C. for 2 h. The resulting product was filtered to afford a precipitate which was then vacuum-dried for 24 h (yield: 66%). The production of the polyamic acid ester-based photo-alignment additive thus obtained was confirmed by NMR and GPC, with a weight average molecular weight of 54,000 and PDI of 1.46. An NMR spectrum of the polyamic acid ester-based photo-alignment additive is illustrated in FIG. 3.

PREPARATION EXAMPLE 4

Synthesis of Cyclic Olefin-based Photo-alignment Polymer 17.1 g (0.138 mol) of 4-fluorobenzaldehyde, 28.7 g (0.276 mol) of malonic acid, and 0.1 equivalent of piperidine were dissolved in 3 equivalents of pyridine. The resulting mixture was stirred at room temperature for 30 min, and further stirred at 90° C. for 5 h. The temperature was lowered to room temperature, and the mixture was titrated to pH 1~2 using a 3 M hydrochloric acid aqueous solution. The formed powder was filtered, and washed with a solvent mixture of ethanol/water (1/9 volume ratio), thus obtaining poly(cinnamate-methyl-2-norbornene) at a yield of 72% with a weight average molecular weight of 703,000 and PDI of 2.0.

PREPARATION EXAMPLE 5

Synthesis of Cyclic Olefin-based Photo-alignment Polymer

In a 250 ml Schlenk flask, 3 g (10.06 mmol) of a (4-fluorocinnamate)-5-norbornene-2-carboxylate monomer and 7 ml of a purified toluene solvent were placed. A solution of 0.98 mg of $(CH_3CO_2)_2Pd$, 6.4 mg of dimethylanilinium tetrakis(pentafluorophenyl)borate, and 1.13 mg of tricyclohexylphosphine dissolved in 1 ml of dichloromethane were added into the flask, and the resulting mixture was reacted at 90° C. for 5 h while stirring it. Thereafter, the reaction product was added to an excess of ethanol, thus obtaining a white polymer precipitate. This precipitate was filtered using a glass funnel, and the recovered polymer was dried in a vacuum oven at 65° C. for 24 h, yielding 1.36 g of poly[(4-fluorocinnamate)-5-norbornene-2-carboxylate] (Mw=289,000, PDI=2.76, yield=45%).

PREPARATION EXAMPLE 6

Synthesis of Cyclic Olefin-based Photo-alignment Polymer

In a 250 ml Schlenk flask, 3 g (10.06 mmol) of a (methylcinnamate)-5-norbornene-2-carboxylate monomer and 7 ml of a purified toluene solvent were placed. A solution of 0.98 mg of $(CH_3CO_2)_2Pd$ and 8.38 mg of dimethylanilinium tetrakis(pentafluorophenyl)borate dissolved in 1 ml of dichloromethane were added into the flask, and the resulting mixture was reacted at 100° C. for 5 h while stirring it. Thereafter, the reaction product was added to an excess of ethanol, thus obtaining a white polymer precipitate. This precipitate was filtered using a glass funnel, and the recovered polymer was dried in a vacuum oven at 70° C. for 24 h, yielding 1.36 g of poly[(methylcinnamate)-5-norbornene-2-carboxylate] (Mw=94,300, PDI=2.92, yield=56%).

PREPARATION EXAMPLE 7

Synthesis of Cyclic Olefin-based Photo-alignment Polymer

In a 250 ml Schlenk flask, 5 g (12.55 mmol) of a 6-(4-oxymethylcinnamate)hexyl-5-norbornene-2-carboxylate monomer and 5 ml of a purified toluene solvent were placed. A solution of 0.56 mg of $(CH_3CO_2)_2Pd$ and 4.79 mg of tricyclohexylphosphonium(tetrakispentafluorophenyl)borate dissolved in 2 ml of dichloromethane were added into the flask, and the resulting mixture was reacted at 90° C. for 18 h while stirring it. Thereafter, the reaction product was added to an excess of ethanol, thus obtaining a white polymer precipitate. This precipitate was filtered using a glass funnel, and the recovered polymer was dried in a vacuum oven at 65° C. for 24 h, yielding 1.4 g of poly[6-(4-oxymethylcinnamate)hexyl-5-norbornene-2-carboxylate] (yield=31%).

EXAMPLES 1 to 5

Preparation of Composition for Photo-alignment Layer and Photo-alignment Layer

The polyamic acid ester-based photo-alignment additive of Preparation Example 1, PETA (pentaerythritol triacrylate), Irgacure 907, and the cyclic olefin-based photo-alignment polymer of Preparation Example 4 were dissolved in a solvent mixture of NMP and BC and mixed. As such, the amounts of individual components are shown in Table 1 below. The resulting composition was measured for voltage holding ratio and afterimage by the methods of Test Example 1.

COMPARATIVE EXAMPLE 1

Preparation of Composition for Photo-alignment Layer and Photo-alignment Layer

A composition for a photo-alignment layer and a photo-alignment layer were formed in the same manner as in Example 1, with the exception that the polyamic acid ester-based photo-alignment additive of Preparation Example 1 was not used. The composition was measured for voltage holding ratio and afterimage by the methods of Test Example 1.

TEST EXAMPLE 1

Evaluation of Voltage Holding Ratio and Afterimage

The voltage holding ratio was measured as follows.
Specifically, the composition for a photo-alignment layer was applied on an ITO or TFT (thin film transistor) substrate using spin coating (1000~1500 rpm, 20 s), dried at 100° C. for 2 min, and irradiated with light at a dose of 15 mw/cm² for 2 min using a UV radiator (UV-A, UV-B), thus forming an alignment layer. As such, UV irradiation was performed by locating a polarizer plate before the UV lamp.

Two alignment layer substrates manufactured as above were superposed with each other using a 3 μm spacer-containing sealant, and the sealant was cured with UV light. Then, IPS liquid crystals were injected using capillary force. A cell containing the liquid crystals was stabilized at 80° C. for 20 min.

The cells of Examples 1 to 5 and Comparative Example 1 manufactured as above were measured for voltage holding ratio. To this end, a 6254C device available from TOYO Corporation was used. The measurement conditions were a frame frequency of 60 Hz, a pulse width of 64, and a data voltage of 5 V. The results of measurement of the voltage holding ratio are given in Table 1 below.

To evaluate a luminance change, 5 V AC and 0.5 V DC were applied to the samples manufactured as above at room temperature for 6 h. The luminance values before and after application of such stress were measured at 1 V AC. The luminance change was determined by subtracting the luminance before application of stress from the luminance after application of stress to obtain a predetermined value which was then divided by the luminance before application of stress, and the resultant values were depicted over time. The level of afterimage was evaluated through the results of measurement of such luminance changes. These luminance change results are illustrated in FIG. 4.

TABLE 1

| | Cyclic olefin-based photo-alignment polymer (wt %) | PETA (wt %) | Polyamic acid ester-based photo-alignment additive (wt %) | Irgacure 907 (wt %) | Voltage holding ratio |
|---|---|---|---|---|---|
| Ex. 1 | 2 | 1 | 0.25 | 0.125 | 98 |
| Ex. 2 | 2 | 1 | 0.5 | 0.125 | 98.5 |
| Ex. 3 | 2 | 1 | 0.75 | 0.125 | 98.3 |
| Ex. 4 | 2 | 1 | 1.0 | 0.125 | 99 |
| Ex. 5 | 2 | 1 | 1.25 | 0.125 | 98.9 |
| C. Ex. 1 | 2 | 1 | 0 | 0.125 | 97.3 |

Figure 4:
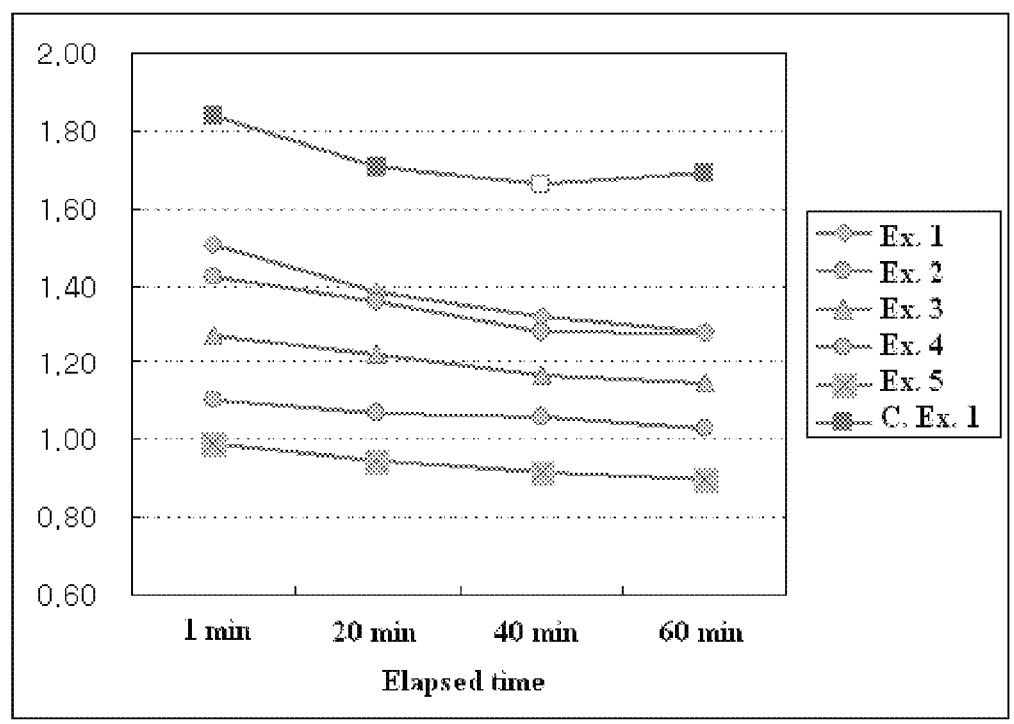
FIG. 4 is a graph illustrating results (for evaluation of an afterimage) of measurement of a luminance change over time after application of stress to a liquid crystal cell including the photo-alignment layer of each of Examples 1 to 5 and Comparative Example 1, in Test Example 1.

As illustrated in FIG. 4, when using the compositions for a photo-alignment layer of Examples 1 to 5, the level of afterimage and the luminance change after application of stress were greatly reduced compared to Comparative Example 1. As is apparent from Table 1, the voltage holding ratio was also improved. In particular, in Examples 3 to 5 using 0.75 wt % or more of the polyamic acid ester-based photo-alignment additive, the afterimage disappeared after 60 min.

TEST EXAMPLE 2

Evaluation of Distribution of Photo-alignment Polymer and Photo-alignment Additive The composition for a photo-alignment layer was applied on an ITO or TFT (thin film transistor) substrate using spin coating (1000 rpm, 30 s), allowed to stand for 20 s, primarily and secondarily heat treated at 80° C. for 30 s and at 95° C. for 30 s, respectively, and then irradiated with light at a dose of 15 mw/cm² for 2 min using a UV radiator (UV-A, UV-B), thus forming an alignment layer. As such, UV irradiation was performed by locating a polarizer plate before the UV lamp.

Two alignment layer substrates manufactured as above were superposed with each other using a 3 μm spacer-containing sealant, and the sealant was cured with UV light. Then, IPS liquid crystals were injected using capillary force. A cell containing the liquid crystals was stabilized at 80° C. for 20 min.

The photo-alignment layers of Examples 1 to 5 and the cells were formed as above, and then the surface of the photo-alignment layer was analyzed by TOF-SIMS to assay the amount of the fluorine substituent (linked to the terminal of the photo-alignment polymer of Preparation Example 2) of the surface of the photo-alignment layer. Furthermore, the amount of fluorine was analyzed depending on the depth from the surface of the photo-alignment layer.

For comparison with the above analytical results, photo-alignment layers and cells were formed in the same manner as in Example 1 using Comparative Example 1 and only the photo-alignment additive of Preparation Example 1, after which the surface of the photo-alignment layer was analyzed by TOF-SIMS as above, and thus the amount of the fluorine substituent of the surface of the photo-alignment layer was assayed.

As is apparent from these analytical results, the amount of fluorine in the photo-alignment layers of Examples 1 to 5 was decreased depending on the depth from the surface of the photo-alignment layer.

What is claimed is:

1. A composition for a photo-alignment layer, comprising a cyclic olefin-based photo-alignment polymer and a polyamic acid ester-based photo-alignment additive,
wherein the polyamic acid ester-based photo-alignment additive includes a repeating unit of Chemical Formula 5 or 6 below:

[Chemical Formula 5]

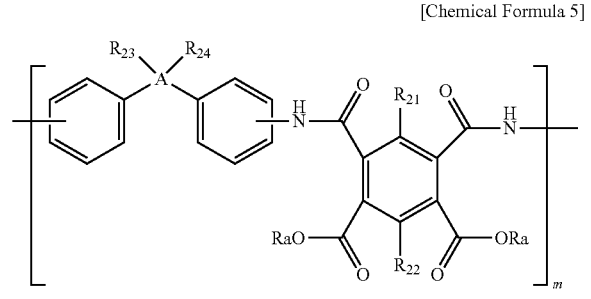

[Chemical Formula 6]

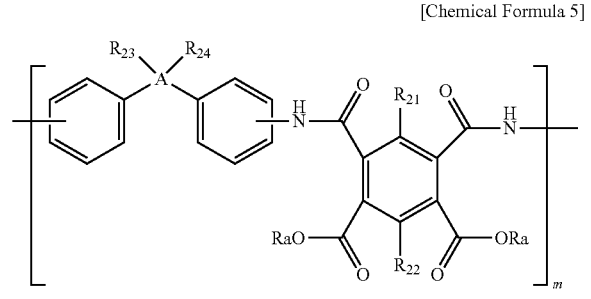

in Chemical Formulas 5 and 6,
m is 100-10,000;
q and r are each independently an integer of 0-4; and
$R_{21}$ and $R_{22}$ are each independently hydrogen, a halogen, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, a substituted or unsubstituted $C_3$-$C_{12}$ cycloalkyl, a substituted or unsubstituted $C_6$-$C_{40}$ aryl, a substituted or unsubstituted $C_7$-$C_{15}$ aralkyl, or a polar functional group including a non-hydrocarbonaceous polar group containing at least one element selected from the group consisting of oxygen, nitrogen, phosphorus, sulfur, silicon, and boron;
in Chemical Formula 6, in the case where $R_{21}$ and $R_{22}$ are not hydrogen, a halogen, or a polar functional group, $R_{21}$ radicals are connected to each other or $R_{22}$ radicals are connected to each other to form a $C_4$-$C_{12}$ saturated or unsaturated ring or a $C_6$-$C_{24}$ aromatic ring, or $R_{21}$ and $R_{22}$ are connected to each other to form a $C_1$-$C_{10}$ alkylidene group;

A is a chemical bond, oxygen, sulfur, phosphorus, or —NH—;

$R_{23}$ and $R_{24}$ are each independently hydrogen, a halogen, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, a substituted or unsubstituted $C_3$-$C_{12}$ cycloalkyl, a substituted or unsubstituted $C_6$-$C_{40}$ aryl, a substituted or unsubstituted $C_7$-$C_{15}$ aralkyl, or a polar functional group including a non-hydrocarbonaceous polar group containing at least one element selected from the group consisting of oxygen, nitrogen, phosphorus, sulfur, silicon and boron; and $R_a$ is a substituted or unsubstituted $C_1$-$C_{20}$ alkyl or a substituted or unsubstituted $C_6$-$C_{40}$ aryl.

2. The composition of claim 1, wherein the cyclic olefin-based photo-alignment polymer has a cinnamate-based photoreactive group of Chemical Formula 1a below:

[Chemical Formula 1a]

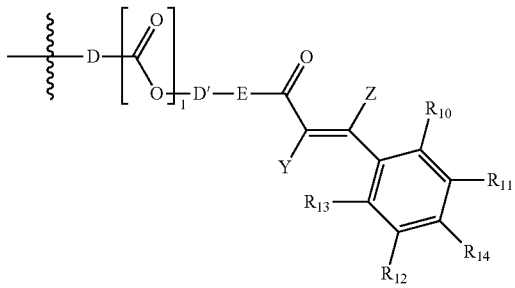

in Chemical Formula 1a,
l is 0 or 1;
D and D' are each independently selected from the group consisting of a chemical bond, oxygen, substituted or unsubstituted $C_1$-$C_{20}$ alkylene, substituted or unsubstituted $C_3$-$C_{12}$ cycloalkylene, and substituted or unsubstituted $C_1$-$C_{20}$ alkylene oxide;
E is a chemical bond; a substituted or unsubstituted $C_1$-$C_{20}$ alkylene; or a substituted or unsubstituted $C_6$-$C_{40}$ arylene oxide;
Y and Z are each independently hydrogen, or a substituted or unsubstituted $C_1$-$C_{20}$ alkyl; and
$R_{10}$, $R_{11}$, $R_{12}$, $R_{13}$, and $R_{14}$ are identical to or different from each other, and are each independently selected from the group consisting of hydrogen, a halogen, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, a substituted or unsubstituted $C_3$-$C_{12}$ cycloalkyl, a substituted or unsubstituted $C_1$-$C_{20}$ alkoxy, a substituted or unsubstituted $C_6$-$C_{30}$ aryloxy, a substituted or unsubstituted $C_6$-$C_{40}$ aryl, a $C_6$-$C_{40}$ heteroaryl containing a hetero element of Group 14, 15, or 16, a substituted or unsubstituted $C_6$-$C_{40}$ alkoxyaryl, a cyano, a nitrile, a nitro, and a hydroxy.

3. The composition of claim 2, wherein the cyclic olefin-based photo-alignment polymer includes a repeating unit of Chemical Formula 3 or 4 below:

[Chemical Formula 3]

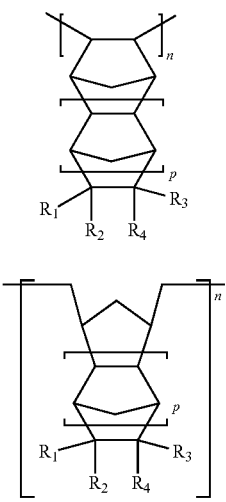

[Chemical Formula 4]

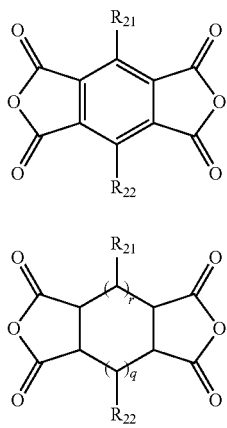

in Chemical Formulas 3 and 4, n is 50-5000;

p is an integer of 0-4; and at least one of $R_1$, $R_2$, $R_3$, and $R_4$ is the cinnamate-based photoreactive group of Chemical Formula 1a, and the others thereof are identical to or different from each other and are each independently hydrogen, a halogen, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, a substituted or unsubstituted $C_5$-$C_{12}$ cycloalkyl, a substituted or unsubstituted $C_6$-$C_{40}$ aryl, a substituted or unsubstituted $C_7$-$C_{15}$ aralkyl, a substituted or unsubstituted $C_2$-$C_{20}$ alkynyl, or a polar functional group including a non-hydrocarbonaceous polar group containing at least one element selected from the group consisting of oxygen, nitrogen, phosphorus, sulfur, silicon, and boron.

4. The composition of claim 1, wherein the polyamic acid ester-based photo-alignment additive is a condensation polymer of an ester derivative of a dianhyride compound of Chemical Formula 5a or 6a below and a diamine compound of Chemical Formula 5b below:

[Chemical Formula 5a]

[structure with $R_{21}$ and $R_{22}$]

[Chemical Formula 6a]

[structure with $R_{21}$ and $R_{22}$]

[Chemical Formula 5b]

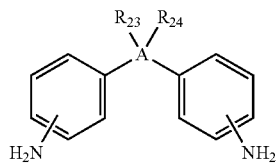

in Chemical Formulas 5a, 5b, and 6a, q and r are each independently an integer of 0-4;

$R_{21}$ and $R_{22}$ are each independently hydrogen, a halogen, a substituted or unsubstituted $C_1$-$C_{20}$ alkyl, substituted or unsubstituted $C_2$-$C_{20}$ alkenyl, a substituted or unsubstituted $C_2$-$C_{20}$ alkynyl, a substituted or unsubstituted $C_3$-$C_{12}$ cycloalkyl, a substituted or unsubstituted $C_6$-$C_{40}$ aryl, a substituted or unsubstituted $C_7$-$C_{15}$ aralkyl, or a polar functional group including a non-hydrocarbonaceous polar group containing at least one element selected from the group consisting of oxygen, nitrogen, phosphorus, sulfur, silicon, and boron; and in Chemical Formula 6a, in the case where $R_{21}$ and $R_{22}$ are not hydrogen, a halogen, or a polar functional group, $R_{21}$ radicals are connected to each other or $R_{22}$ radicals are connected to each other to form a $C_4$-$C_{12}$ saturated or unsaturated ring or a $C_6$-$C_{24}$ aromatic ring, or $R_{21}$ and $R_{22}$ are connected to each other to form a $C_1$-$C_{10}$ alkylidene group;

A is a chemical bond, oxygen, sulfur, phosphorus, or -NH-; and $R_{23}$ and $R_{24}$ are each independently hydrogen, a halogen, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, a substituted or unsubstituted $C_3$-$C_{12}$ cycloalkyl, a substituted or unsubstituted $C_6$-$C_{40}$ aryl, a substituted or unsubstituted $C_7$-$C_{15}$ aralkyl, or a polar functional group including a non-hydrocarbonaceous polar group containing at least one element selected from the group consisting of oxygen, nitrogen, phosphorus, sulfur, silicon, and boron.

5. The composition of claim 1, wherein the cyclic olefin-based photo-alignment polymer and the polyamic acid ester-based photo-alignment additive are contained at a weight ratio of 2:1-8:1.

6. The composition of claim 1, further comprising a photocurable binder and a photoinitiator.

7. The composition of claim 6, wherein the photocurable binder includes a (meth)acrylate-based compound.

8. The composition of claim 7, wherein the (meth)acrylate-based compound includes at least one selected from the group consisting of pentaerythritol triacrylate, tris(2-acryloyloxyethyl)isocyanurate, trimethylolpropane triacrylate, and dipentaerythritol hexaacrylate.

9. The composition of claim 1, further comprising an at least one organic solvent selected from the group consisting of toluene, anisole, chlorobenzene, dichloroethane, cyclohexane, cyclopentane, and propylene glycol methyl ether acetate.

10. The composition of claim 6, comprising, based on a total weight of solids of the composition, 35-75 wt % of a polymer including both the cyclic olefin-based photo-alignment polymer and the polyamic acid ester-based photo-alignment additive, 20-60 wt % of the binder, and 1-6 wt % of the photoinitiator.

11. The composition of claim 10, which includes a solid content of 1-15 wt %.

12. A photo-alignment layer comprising the composition of claim 1 or a cured product thereof.

13. The photo-alignment layer of claim 12, comprising a cyclic olefin-based photo-alignment polymer in which at least a portion of a photoreactive group is optically aligned, and a polyamic acid ester-based photo-alignment additive.

14. A liquid crystal alignment layer comprising the photo-alignment layer of claim 12, and a liquid crystal layer formed on the photo-alignment layer.

15. The liquid crystal alignment layer of claim 14, wherein a cyclic olefin-based photo-alignment polymer is distributed in a larger amount at an upper surface of the photo-alignment layer in contact with the liquid crystal layer than at a lower surface thereof.

16. The liquid crystal alignment layer of claim 14, wherein a polyamic acid ester-based photo-alignment additive is distributed in a smaller amount at an upper surface of the photo-alignment layer in contact with the liquid crystal layer than at a lower surface thereof.

17. The liquid crystal alignment layer of claim 15, wherein the upper surface of the photo-alignment layer in contact with the liquid crystal layer exhibits a higher intensity of peak derived from a substituent linked to a terminal of the photo-alignment polymer compared to the lower surface thereof, when analyzed or measured by TOF-SIMS (Time-of-Flight Secondary Ion Mass Spectroscopy).

18. A liquid crystal cell, comprising the liquid crystal alignment layer of claim 14.

\* \* \* \* \*